United States Patent [19]

Cosentino

[11] 4,142,414
[45] Mar. 6, 1979

[54] ULTRASONIC FLOW METER

[75] Inventor: Louis C. Cosentino, Wayzata, Minn.

[73] Assignee: Renal Systems, Inc., Minneapolis, Minn.

[21] Appl. No.: 839,811

[22] Filed: Oct. 6, 1977

[51] Int. Cl.² .............................................. G01F 1/66
[52] U.S. Cl. .................................... 73/216; 73/290 V
[58] Field of Search ................ 73/207, 209, 215, 216, 73/290 V, 194 A

[56] References Cited

U.S. PATENT DOCUMENTS

| 2,479,786 | 8/1949 | Stevens | 73/216 |
| 3,212,338 | 10/1965 | O'Maley | 73/290 V X |
| 3,914,995 | 10/1975 | Yoshida | 73/209 X |
| 4,061,031 | 12/1977 | Grimsrud | 73/215 X |

FOREIGN PATENT DOCUMENTS 2128750  1/1973  Fed. Rep. of Germany ........ 73/194 D Primary Examiner—Charles A. Ruehl Attorney, Agent, or Firm—Schroeder, Siegfried, Ryan, Vidas & Steffey

[57] ABSTRACT

This invention relates to an ultrasonic flow meter utilizing a conventional tubular member with an inlet and outlet. An ultrasonic transducer is located in the member to transmit and receive ultrasonic energy through liquid flowing through the member. An energizing means is connected to the transducer so that ultrasonic energy can be transmitted through the liquid in the member. Reflector means variably positionable within the member are provided for establishing a position for the reflector means which is proportional to liquid flow rate through the member and for reflecting ultrasonic energy from the transducer back to the transducer. Control means are provided for producing at least a single pulse of ultrasonic energy from the transducer to be transmitted through the liquid and for detecting an echo pulse reflected from the reflector means. Means are provided for converting the time between transmission of the ultrasonic pulse and receipt of the echo pulse by the transducer to a signal proportional to the liquid flow rate through the tubular member.

6 Claims, 7 Drawing Figures

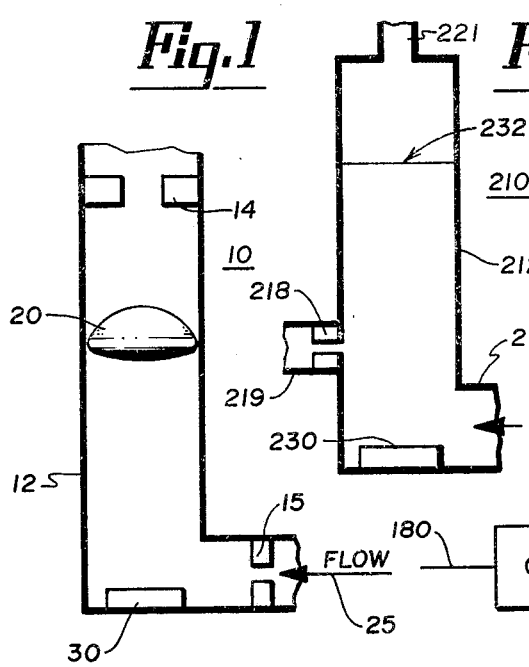
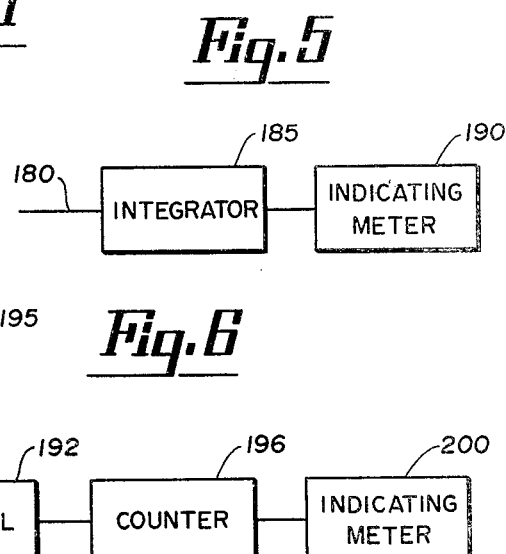
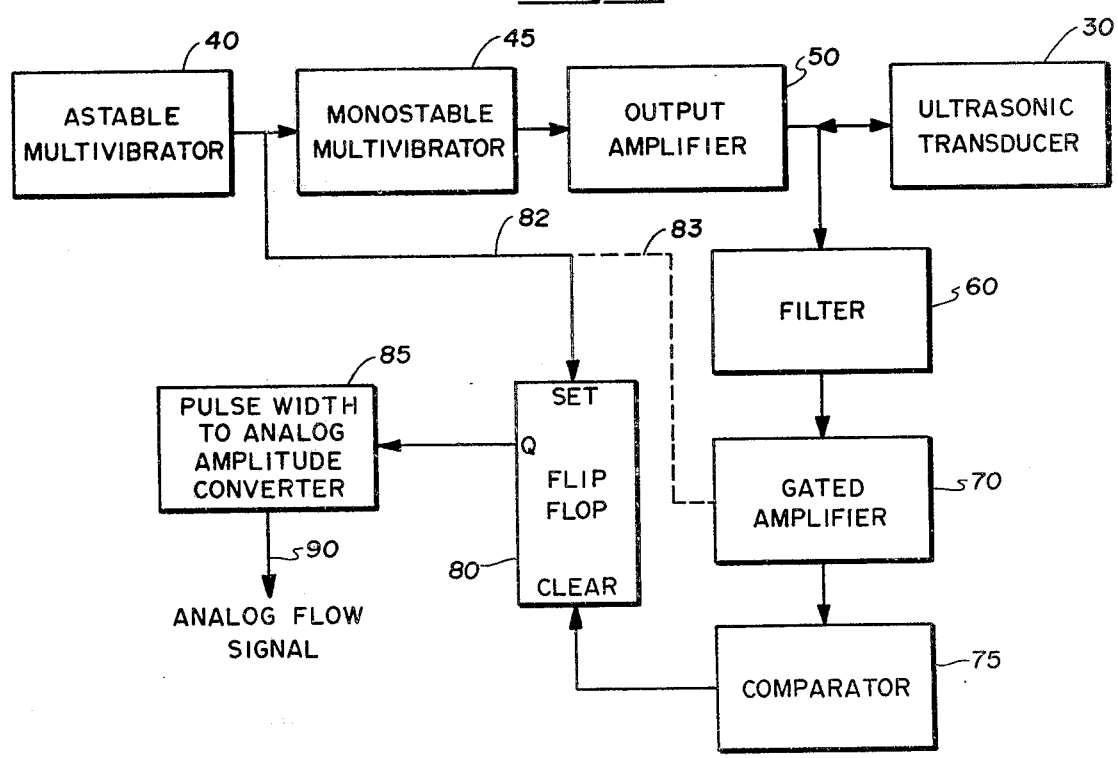

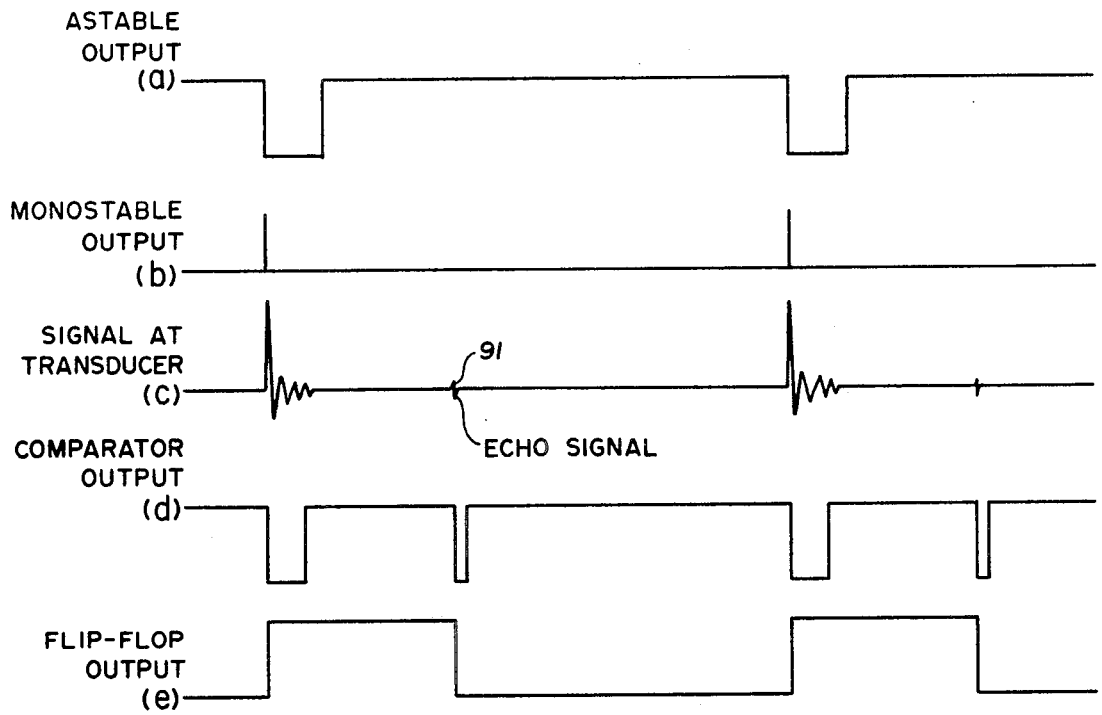
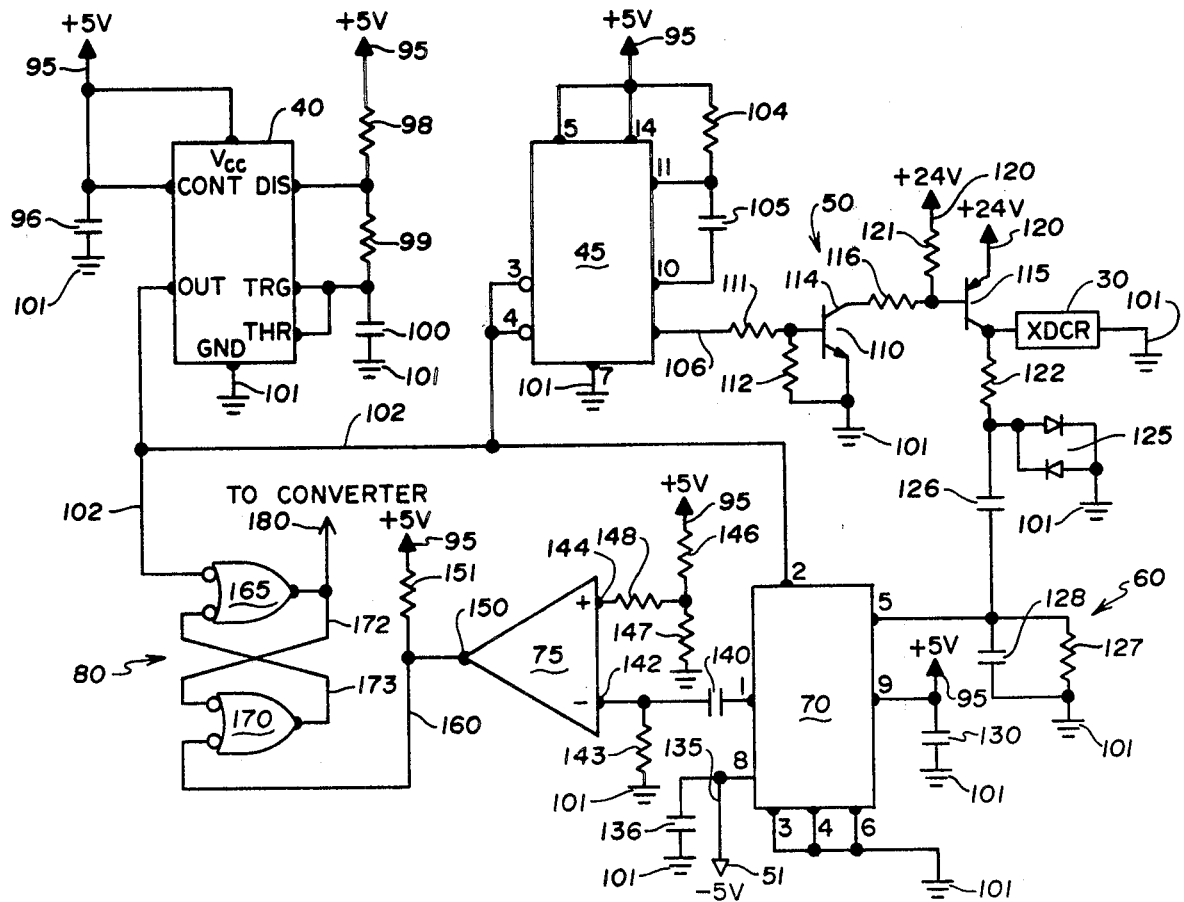

ULTRASONIC FLOW METER

FIELD AND BACKGROUND OF THE INVENTION

This invention relates to ultrasonic flow meters and more particularly to an improved ultrasonic flow meter using a single transducer which is sensitive, accurate and simple in design.

Acoustic or ultrasonic flow meters are known and in use. These prior designs, however, are all exceedingly complex in both the design of the flow chamber and transducers and in the circuitry associated with the same. The patent to Pederson et al U.S. Pat. No. 4,011,755 dated Mar. 15, 1977 and entitled ACOUSTIC FLOW METER is one of such type. It utilizes a pair of transducers at opposite points in the flow meter between which gated bursts of relatively high frequency of acoustic energy is transmitted. The transmission is alternately in an upstream and downstream direction. By measuring the relative phase shifts of the upstream and downstream transmissions, a measurement proportional to a flow rate is obtained. The patent to E. Hausler U.S. Pat. No. 4,011,753 dated Mar. 15, 1977, and entitled METHOD AND DEVICE FOR MEASURING THE FLOW VELOCITY OF MEDIA BY MEANS OF ELECTROSOUND discloses an arrangement in which ultrasonic transducers are located at the opposite ends of a measuring section with the transducers having concave surfaces which face each other and which are located in mutual co-focal relationship. The ultrasonic transducers operate alternately as emitters or receivers or two transducers may be used at each end of the measuring section, one being an emitter and one being the receiver. By measuring transit time of the ultrasonic energy in the flow direction and in the opposite direction, a time differential proportional to flow rate is obtained.

Still other known flow meters have utilized the transducer arrangement of two emitter receiver units transmitting in both directions with a resolution of the frequency difference in the transmissions to determine time of transmission and hence, rate of flow of the medium.

A further known ultrasonic flow meter is based on the Doppler-frequency shift of a movable reflector or reflector material. The reflected sound waves are picked up by a receiver and the determined Doppler shift is used for determining the velocity of flow of the fluid. The disadvantage of this measuring method is in the extensive equipment for beaming the sound waves as well as for the elimination of temperature influence and presence of particles in the fluid necessary for the reflection of sound waves.

Another known ultrasonic device for acoustic flow measurements in fluids uses special modulation means for measuring the transit time for the sound waves along at least one path extending through the fluid. The signal generator emits an oscillation which is frequency-modulated in accord with an exacting predetermined principal and has a constant duration. The difference in transit times of the sound waves in the media is measured and the output signal representing this difference is measured by means of a timing frequency which is corrected as a function of the sound velocity of the fluid. The main drawback of this measuring device is the great band width of the acoustic electric transducer necessary for accomplishing the method.

SUMMARY OF INVENTION

The present invention in its preferred embodiment is directed to an ultrasonic flow meter which utilizes a conventional flow meter tube having a level indicating float therein or Rotameter with an ultrasonic transducer to electrically provide an indication of flow through the flow meter. The flow meter tube is a generally tapered vertical tube member having input and output connections at the ends of the same which are adapted to be connected into the flow stream. Suitable restrictions or orifices may be included at either or both the inlet and outlet. The float seeks a height or level within the tube determined by the float characteristics and the flow of liquid around the same within the tube member. As an alternate embodiment, the flow meter may employ a tube with restriction in the outlet positioned in the wall of the tube in which liquid will seek a height within the tube equal to flowrate therethrough. The signal ultrasonic transducer within the tube member performs a transmitting and receiving function and is preferrably positioned at or near the inlet of the tubular member. An energizing means connected to the transducer provides for pulsed ultrasonic energy to be transmitted through liquid in the member and to be reflected off the float in the one embodiment or the surface of the liquid within the tubular member in the alternate embodiment. The spacing of the pulsed energization of the transducer is of such duration as to permit an echo to be received by the transducer before it is reenergized. Suitable control means gates the response from the transducer in a receiver mode of operation to a detecting and comparing network which operates through a flip-flop to determine a pulse width which is proportional to the flowrate of fluid through the meter. This pulse width is converted into flow indication at a meter.

BRIEF DESCRIPTION OF THE DRAWINGS

FIG. 1 is a schematic view of the flow tube portion of the ball flow meter with transducer for the improved ultrasonic flow meter;

FIG. 2 is a schematic block diagram of the electrical circuit portion of the same;

FIG. 3 is a timing diagram of the outputs of various components of the measuring circuit;

FIG. 4 is a schematic electrical diagram of the circuit of FIG. 2;

FIG. 5 is a block diagram of one embodiment of the measuring and indicating portion of the control circuit;

FIG. 6 is a block diagram of an alternate embodiment of the measuring and indicating portion of the control circuit, and, FIG. 7 is a schematic view of another form of the flow meter with an ultrasonic transducer.

DESCRIPTION OF THE INVENTION

FIG. 1 shows the sensing portion of the flow meter schematically at 10. It includes a generally tubular member 12 with restrictions 14 and 15 normally at the ends of the member and with a float member 20 positioned within the tubular member and adapted to ride on the fluid built up therein. It should be understood that in some applications either one or both of restrictions 14 and 15 may be unnecessary. Such a flow meter is conventional and will normally take a flow therethrough as indicated by the arrow 25. The rate of flow of the fluid through the tubular member and the type of fluid flowing through the tube will cause the float 20 to rise in the tube to a height proportional to the rate of flow of the fluid. The height of the float within the tubular member as determined by graduations on the member can then be related to rate of flow through the use of corresponding charts. Such a flow meter is particularly adapted for use in the measurement of relatively low flow rates and with various types of fluids.

In the present invention, this type of flow meter is modified to include the positioning of an ultrasonic transducer 30 in the base of the tubular member adjacent the inlet port and restriction thereto. The height of the float within the tubular member can then be determined ultrasonically with a simplified circuit to be hereinafter defined. In this arrangement of parts, the transducer operates as a transmitter and receiver with periodic pulses gated therefrom. The transducer, which employs a Barium titanate crystal, is readily positioned within the flow meter body or tubular member through the use of the removable end caps which include the restrictions and pipe connections thereto. Suitable insulated electrical wiring connects the transducer in a circuit, with the wiring being brought out through the wall of the fittings. The transducer is preferably located at the inlet end of the transducer, although it will be recognized that in measuring the position of the float within the tubular member, that it may be placed at the outlet end if desired. The present invention is particularly adapted for use in the medical field because the system is non-invasive and the system may be built with materials which are inert and non-reactive to the body.

FIG. 2 shows a block diagram of the electrical circuit of the improved ultrasonic flow meter. The ultrasonic transducer 30 is energized from an astable multivibrator 40 which in turn is connected to and controls the operation of a monostable multivibrator 45. The peaked output of the monostable multivibrator is directed through an amplifier 50 to the transducer 30 to direct the ultrasonic pulse through the liquid in the flow meter body. The return or echo pulse received by the transducer is coupled through a filter 60 and gated amplifier 70 to a comparator 75. The output of the comparator controls an input of the flip-flop 80 marked CLEAR. The output of the astable multivibrator 40 is also coupled to the flip-flop 80 and the 70 gated amplifier as indicated by the connections 82 and 83 respectively, with the connection 82 providing an input to the input marked SET of the flip-flop 80. The flip-flop in turn controls the width of a pulse which is connected by a pulse-width-to-analog-amplitude converter 85. Converter 85 provides an analog amplitude output proportional to the rate of flow through the flow meter, as indicated by the conductor 90. Although not shown, it will be understood that this output will be connected to and control the operation of an indicating meter.

A timing diagram of FIG. 3 for the flow meter shows at 3 (a) that the pulsed output from the astable multivibrator 40 has a pulse spacing or frequency which is adjusted to be greater than the time it takes for a pulse of ultrasonic energy to be transmitted through the liquid medium and the echo to be returned to the receiver. Diagram 3 (b) shows that the monostable multivibrator 45 as controlled by the astable multivibrator 40 provides a peaked output pulse or spiked pulse which is provided simultaneously with the initiation of the pulse from astable multivibrator 40 and which after being amplified by amplifier 50, is fed to the transducer 30. Diagram 3 (c) shows the signal at the transducer in which the basic spiked output pulse is transmitted by the transducer and then an echo signal, as indicated by the blip at 91, is received by the transducer sometime prior to the next transmitted pulse from the transducer. Diagram 3 (d) shows the output of the comparator 75. Although gated by the pulse signal from the multivibrator 40, the gating amplifier 70 does not prevent all of the transmitted signal from reaching the comparator and consequently, the comparator will normally show a slight response at the start of the transmission of the pulse. The echo pulse similarly appears between the transmission pulses. Diagram 3 (e) shows the output of the flip-flop control circuit which provides a positive going pulse at the start of the transmission which continues and is shut off at the time of the receipt of the echo pulse. The width of this pulse is the time of transmission and receipt of the ultrasonic signal by the transducer and is proportional to the height of the column of liquid in the flow meter and hence, the rate of flow therethrough.

In the circuit diagram of FIG. 4, the astable multivibrator 40 is shown as an LM555 timer connected for astable operation. The input and control terminals are connected to a 5 volt DC source 95 with the source being connected through a filter capacitor 96 to ground 101 and common to the control terminal. The 5 volt source 95 is also connected through resistors 98, 99, and capacitor 100 to ground 101, with a discharge terminal being connected between the resistors 98 and 99, and the threshold and trigger terminals being connected between the resistor 99 and capacitor 100. The operation of the timer is astable operation provides an output as shown in timing diagram 3 (a). The external capacitor 100 charges through resistors 98 and 99 and discharges through resistor 99. The duty cycle can be precisely set by the ratio of these two resistors. The charge and discharge times of the capacitor and hence, its output cycle are independent of supply voltage. The output terminal is connected to conductor 102 leading to the monostable multivibrator 45. This is a conventional monostable multivibrator having the type number N74121. Its input terminals are connected to the conductor 102. A 5 volt supply 95 is connected to the input energization terminals, one of the control terminals 14, and through a resistor 104 and capacitor 105 to two of the control terminals or timing pins 11 and 10 respectively. The vibrator is grounded through terminal 7 as at 101 and the output is taken on conductor 106. The input on the control terminals 3 and 4 from conductor 102 are negative-edge triggered logic input which will trigger a one shot output with a positive signal on the input terminal 5. Thus the peaked output as seen in timing diagram 3 (b) is obtained. The pulsed output is fed through the power amplifier, indicated generally at 50, and including transistors 110 and 115 respectively. The conductor 106 is connected through a bias resistor 111 to the base of transistor 110 with the base of the transistor being grounded through resistor 112. Its emitter is also grounded. The collector 114 is connected through a resistor 116 to the base of transistor 115 which receives a plus supply from a 24 volt source 120 through a resistor 121. The emitter of transistor 115 is also connected directly to the 24 volt source 120 with the collector being connected to the transducer 30 which is grounded as at 101. The output from the transducer is connected through a resistor 122 to a pair of clamping diodes 125 which have the type number IN4448, the diodes being grounded as at 101. The signal is coupled through a capacitor 126 to a resistor 127 and capacitor 128 connected in parallel, which are grounded at 101 and form the filter portion 60 of the circuit. The signal from the filter is coupled to the input terminal 5 of the gated amplifier 70 which takes the type number MC1445. Amplifier 70 has a terminal 9 connected to the 5 volt source 95 with the source being connected through a capacitor 130 to ground at 101. A gate control input for this gated amplifier is obtained from the conductor 102 at terminal 2 having the output of the astable multivibrator thereon. A minus 5 volt input supply 51 is connected by line 135 to another terminal with the supply being connected to a capacitor 136 and ground at 101. The output of the gated amplifier 70 on terminal 1 is taken through the capacitor 140 to a negative input terminal 142 of the comparator amplifier 75. This input terminal is also connected through a resistor 143 to ground. The reference signal terminal 144 is connected to a 5 volt DC supply 95 through voltage divider resistors 146 and 147. The latter are grounded and the mid-point of the resistors 146 and 147 is connected through a resistor 148 and the plus input terminal 144. The output of the comparator, as indicated by the terminal or conductor 150, is connected to the 5 volt supply 95 through a resistor 151 to provide a voltage output on conductor 160 leading to one input of a pair of nand gates connected in a flip-flop circuit 80. The flip-flop circuit 80 is comprised of nand gates 165 and 170 each taking the type number N7400 which are dual input positive nand gates. One input of gate 165 is connected to the conductor 102 receiving the output of astable multivibrator 40. The control input of the nand gate 170 is connected to the conductor 160 to receive the control input from the comparator 75. The respective outputs of the nand gates are interconnected by conductors 172 and 173 to the opposite input terminals of the opposite nand gate. The output terminal 172 of gate 165 is also connected to a convertor through a conductor 180 which senses the width of the pulse shown at timing diagram 3 (e). This pulse width is proportional to the height of the float in the flow meter or the time it takes for a pulse leaving the transducer 30 to be received as an echo from the float. The pulse width is therefore proportional to the rate of flow of the fluid through the flow meter.

It will be noted in the circuit that the astable multivibrator 40 controls the gated amplifier 70 but that the peaked output from the monostable multivibrator 45 to the transducer 30 will be detected therethrough and provide an output pulse from the comparator 75. However, the pulses are of a short duration and do not alter the condition of the flip-flop circuit 80 which is set by the output of the astable multivibrator 40 or the signal impressed on conductor 102 as shown in timing diagram 3 (a). The flip-flop circuit will provide a positive going pulse, the duration of which will continue until the comparator senses the echo pulse and provides a input signal on the nand gate 170 causing the flip-flop circuit to change the output of the nand gate 165 and terminating the output from the flip-flop circuit.

In FIG. 5, as shown in block diagram, an intergrator 185 connected to the output of the flip-flop circuit 80 through the conductor 180 which integrator is connected to an indicating meter indicated generally at 190. The width of the output pulse controls the operation of the integrator to provide an analog output signal in proportion to the magnitude of the pulse width which is coupled to the meter 190 to provide an indication of flow.

In FIG. 6, the output of the flip-flop circuit 180 energizes a controller 192 which controls a free running clock 195. The clock will provide a series of pulses to a counter 196 in accord with the pulse width from the flip-flop connect. The counter output provides visual indication in analog or digital form on a meter or indicator 200. In each instance, the frequency of pulses from the astable multivibrator will be such that the integrator or the control of the clock will be shut off with the receipt of the echo pulse. The timing of the pulses will be such that the indicating meter or indicator will have sufficient built-in delay to indicate the converted signal or rate of fluid-flow, as determined by the width of the signal on the flip-flop output.

FIG. 7 shows an alternate embodiment of a flow meter 210 which employs the generally vertical tubular member 212 without the float member. A restriction 218 is positioned in the outlet 219 of the tubular member 212 which is located in the wall of the same. In some applications it may not be necessary to have restriction 218. The inlet 220 is unrestricted and the top of the tubular member 212 may be vented to atmosphere, as at 221. Flow of liquid into the tubular member will establish a height or column of liquid in the tubular member which will be determined by the pressure of the liquid flowing into inlet 220 inlet pressure and the flow rate of the liquid through the tubular member. The height of the column will be proportional (not linearly) to velocity of flow out of the tubular member. A transducer crystal 230 is mounted in the base or bottom of the tubular member 212 and the ultrasonic energy transmitted by transducer 230 will be reflected off of the interface between the top surface of the column of liquid and the air-filled space above the liquid shown at 232.

The operation of this version of the flow meter is the same as the preferred embodiment in which the pulsed ultrasonic energy is transmitted through the column of liquid within the tubular member and reflected back to the transducer as an echo pulse. The time elapse between transmission and echo is proportional to the height of the liquid column and hence proportional to flow through the meter. The same circuit embodiments shown in FIGS. 2–4 are used in the measurement of elapsed time and flow rate. In using flow meter 210 of FIG. 7, FIG. 5 or FIG. 6 must be modified to include a non-linear convertor to convert fluid height, h, to flow rate Q by $Q = K\sqrt{h}$ where K is a constant.

In considering this invention, it should be remembered that the present disclosure is illustrative only and the scope of the invention should be determined by the appended claims.

What I claim is:

1. An ultrasonic flow meter comprising, a vertical tubular member having an inlet and an outlet in the member with inlet and outlet being adapted to be connected to a liquid flow system, ultrasonic transmitting and receiving transducer means positioned in said vertical tubular member for transmitting and receiving ultrasonic energy through liquid flowing through the member, energizing means connected to said transducer means for causing ultrasonic energy to be transmitted through the liquid in said member, reflector means variably positionable within said tubular member for providing a position proportional to liquid flow rate through said member and for reflecting ultrasonic energy from said transducer means back to said transducer means, said reflector means being provided by an interface between the top surface of the liquid and an air-filled space located within the tubular member above the liquid and defining with the liquid the top of the column, control means including means for producing at least a single pulse of ultrasonic energy from said transducer to be transmitted through the liquid and for detecting an echo pulse reflected from said reflector means, and means for converting the time between transmission of said ultrasonic pulse and receipt of said echo pulse by said transducer means to a signal proportional to the rate of flow of fluid through said tubular member.

2. The ultrasonic flow meter of claim 1 further including flow restriction means located in said tubular means for restricting liquid flow therethrough.

3. The ultrasonic flow meter of claim 2 wherein said flow restriction means includes a restriction near the outlet.

4. The ultrasonic flow meter of claim 1 in which the ultrasonic transmitting and receiving means is a single transducer.

5. The ultrasonic flow meter of claim 1 in which the energizing means connected to the transducer means includes an astable multivibrator controlling a monostable multivibrator to provide the pulsed output having a spacing greater than the time required for receipt of an echo pulse by said transducer means in said tubular member.

6. The ultrasonic flow meter of claim 1 in which the transducer means is a Barium titanite crystal mounted in the tubular member between the inlet and outlet.

* * * * *